United States Patent [19]
Katoh et al.

[11] Patent Number: 5,249,557
[45] Date of Patent: Oct. 5, 1993

[54] FUEL INJECTION SYSTEM FOR TWO CYCLE ENGINE

[75] Inventors: Masahiko Katoh; Masanori Takahashi, both of Hamamatsu, Japan

[73] Assignee: Sanshin Kogyo Kabushiki Kaisha, Hamamatsu, Japan

[21] Appl. No.: 831,786

[22] Filed: Feb. 5, 1992

[30] Foreign Application Priority Data

| Feb. 18, 1991 | [JP] | Japan | 3-44017 |
| Feb. 25, 1991 | [JP] | Japan | 3-53412 |
| Feb. 25, 1991 | [JP] | Japan | 3-53413 |
| Feb. 28, 1991 | [JP] | Japan | 3-58046 |
| Mar. 26, 1991 | [JP] | Japan | 3-86227 |

[51] Int. Cl.$^5$ ............... F01L 11/00; F02B 33/04
[52] U.S. Cl. ............... 123/305; 123/73 PP
[58] Field of Search ......... 123/305, 299, 73 C, 123/73 B, 73 PP, 65 BA, 65 P, 65 W, 533

[56] References Cited

U.S. PATENT DOCUMENTS

| 3,993,030 | 11/1976 | Jaulmes | 123/73 B |
| 4,318,377 | 3/1982 | Occella et al. | 123/305 |
| 4,612,898 | 9/1986 | Steiger et al. | 123/299 |
| 4,708,100 | 11/1987 | Luo | 123/73 PP |
| 4,790,270 | 12/1988 | McKay et al. | 123/305 |
| 4,841,942 | 6/1989 | McKay | 123/533 |
| 4,899,714 | 2/1990 | Schechter | 123/533 |
| 5,022,367 | 6/1991 | Morikawa | 123/65 BA |
| 5,060,602 | 10/1991 | Maissant | 123/73 PP |
| 5,150,691 | 9/1992 | Imajo | 123/432 |

FOREIGN PATENT DOCUMENTS

62-87634 4/1987 Japan .
62-253920 11/1987 Japan .

Primary Examiner—E. Rollins Cross
Assistant Examiner—M. Macy
Attorney, Agent, or Firm—Ernest A. Beutler

[57] ABSTRACT

A fuel injection system for engines that employs a fuel injector that sprays into a chamber to which compressed air is delivered and which chamber communicates with the combustion chamber through a port that is opened and closed by the reciprocation of the piston if applied to a reciprocating engine. The source of compressed air may either be an air compressor or a crankcase chamber of the engine and the air compressor and/or crankcase chamber may also provide scavenging air for the engine. A variety of port arrangements are disclosed which include either single ports or a plurality of ports either circumferentially or axially spaced from each other and disposed between either the scavenge ports and exhaust ports or around a scavenge port or an exhaust port.

100 Claims, 19 Drawing Sheets

FUEL INJECTION SYSTEM FOR TWO CYCLE ENGINE

BACKGROUND OF THE INVENTION

This invention relates to a fuel injection system and more particularly to a fuel injection system that may be employed in a two cycle or ported engine.

The advantages of fuel injection over carburetion are well known. However, there are certain disadvantages with existing forms of fuel injection systems.

It is, therefore, a principal object to this invention to provide an improved fuel injection system for an engine.

The types of fuel injections systems previously employed fall into two general categories. These are those that employ direct cylinder injection, where fuel is injected directly into the combustion chamber, or manifold or scavenge port injection systems, where the fuel is injected not into the combustion chamber but somewhere in the induction system for the combustion chamber. Each type of system had certain disadvantages.

With direct cylinder injection systems, the injector itself is exposed to the high pressure and temperature in the combustion chamber when the charge is burning. In order to resist these high temperatures, it is necessary to use extremely expensive injectors. Also, the injector valve tends to become clogged with carbon and may render it either inoperative or have it fail to properly seal.

Although an arrangement has been proposed wherein the injector is disposed in the cylinder side wall so that it will be masked during at least a portion of the combustion cycle, these systems also require either a check valve to protect the injector during the combustion cycle when the injector is uncovered by the motion of the piston or, alternatively, the high pressure high cost type of systems must be employed. In addition, such placement can give rise to problems in inadequate vaporization of the fuel.

If, on the other hand, the fuel is injected into the induction system, then some of the advantages of fuel injection are not realized. That is, with direct cylinder injection it is possible to obtain some form of stratification so as to minimize the amount of fuel consumed and to control the emission of unburned hydrocarbons under low and mid range performance. However, when the injection is into the induction system, stratification is difficult to obtain.

There also has been proposed a type of injection which injects not only fuel but also air. This type of injector has been applied in either the direct or manifold systems of the type aforedescribed. However, it has the same disadvantages as previously noted and additionally is a more complicated type of injector since it requires a fuel injector, an air compressor, and a control for both the fuel injector and the opening and closing of the air injection valve. Also, this type of system may require a pressure regulator for regulating the pressure difference between the fuel pressure and the pressure of an air chamber in the injector into which fuel may be injected.

It is, therefore, a further object to this invention to provide an improved fuel injection system wherein the fuel injector achieves the advantages of direct cylinder injection without having to withstand the temperatures and pressure existent in the combustion chamber.

It is a further object to this invention to provide a fuel injection system wherein air or another gas can be employed to assist the vaporization but the complicated air/fuel injectors previously proposed are not necessary.

It is a further object to this invention to provide an improved air/fuel type of injection system wherein a simple fuel injector may be employed and the benefits of direct cylinder injection may also be achieved without the complication of conventional air/fuel injectors.

There is a further disadvantage with the type of fuel injectors previously proposed. For the most part, these injectors have an injection nozzle from which the fuel is discharged through an opening controlled by an injection valve. As a result of this construction, the fuel is sprayed in a generally conical fashion into the area where it is discharged. Because it is desirable to maintain a relatively small construction for the fuel injector and particularly its nozzle portion, the fuel spraying from the nozzle of the fuel injector is not dispersed over a wide area.

In addition, if the fuel injector sprays directly into the combustion chamber, it is normally mounted in the cylinder head of the engine and thus sprays downwardly toward the cylinder bore. However, when employed with two cycle engines, the porting of the engine generally is configured to achieve some scavenging through a predetermined flow pattern in the cylinder. The fuel sprayed from the injector nozzle normally is in a direction that opposes the scavenging action and hence the fuel may be dispersed due to these differences in flow direction and the desired degree of stratification can not obtained.

Although certain of these disadvantages can be avoided by mounting the injector in the cylinder rather than in the cylinder head, this means that the injector nozzle will be exposed to the movement of the piston as it reciprocates. In addition, it is still not possible to provide wide dispersion of the spray from the fuel injector and the fuel injector must be positioned in a spaced relationship relative to the ports of the engine. Hence, the scavenge flow through the cylinder can not be employed in conjunction with the injected fuel to further improve stratification.

It is, therefore, a further object to this invention to provide an improved fuel injection system for an engine which permits the fuel to be dispersed in any desired pattern and in a direction wherein stratification can be maintained in the injected fuel even when scavenging action is employed.

SUMMARY OF THE INVENTION

This invention is adapted to be embodied in a fuel injection system for an internal combustion engine having a variable volume combustion chamber defined by a pair of relatively moveable components. A nozzle port extends through one of the components and is opened and closed by the relative movement of the components. A conduit extends to the nozzle port from externally of the combustion chamber and means are provided for delivering a pressurized gas to the conduit during at least a portion of the time when the nozzle port is opened. A fuel injector injects fuel into the conduit.

In accordance with another feature of the invention, a plurality of nozzle ports are employed all of which communicate with the conduit and which nozzle ports may be differently configured and sized so as to provide the desired dispersion of fuel in the chamber.

DETAILED DESCRIPTION OF THE PREFERRED EMBODIMENTS OF THE INVENTION

Figure 1:
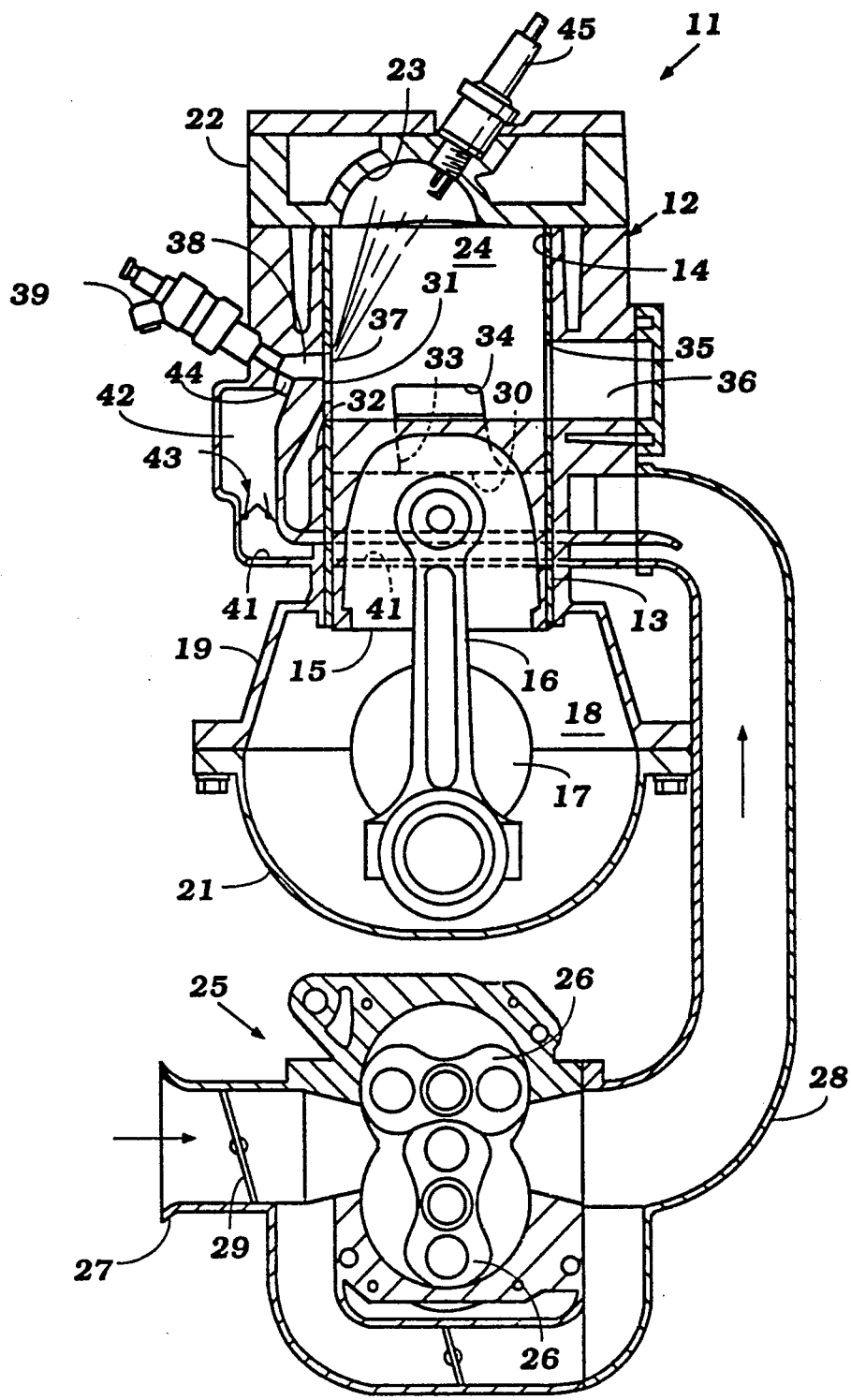
FIG. 1 is a partially schematic cross sectional view taken through a single cylinder of an engine having a fuel injection system constructed in accordance with a first embodiment of the invention.

Referring now in detail to the drawings and initially to the embodiment of FIG. 1, a multiple cylinder internal combustion engine constructed in accordance with this embodiment is identified generally by the reference numeral 11. Although the engine 11 is a multiple cylinder engine, only a single cylinder thereof is shown in cross section. It is believed that those skilled in the art will readily understand how the invention may be practiced with multiple cylinder engines, or in fact, engines having multiple combustion chambers and other than reciprocating engines. The engine 11 also operates on a two stroke principal but it will be understood that certain facets of the invention may also be employed in conjunction with four stroke engines. However, the invention does have particular utility in connection with two stroke engines.

The engine 11 is comprised of a cylinder block, indicated generally by the reference numeral 12 and in which a pressed or cast-in cylinder 13 is contained which defines a cylinder bore 14. A piston 15 is supported for reciprocation within the cylinder bore 14 and is connected by means of a connecting rod 16 to a throw of a crankshaft 17. The crankshaft 17 is rotatably journalled within a crankcase chamber 18 formed by a skirt 19 of the cylinder block 12 and a crankcase member 21 that is affixed to the skirt 19 in a known manner.

A cylinder head 22 is affixed to the cylinder block 12 in a known manner and has a recess 23 which cooperates with an area formed above the head of the piston 15 and the cylinder bore 14 to define a variable volume chamber 24. As the piston 15 reciprocates relative to the cylinder block and cylinder head 22, the volume of the chamber 24 will vary. The chamber 24 and recess 23 will, at times, be referred to as the combustion chamber.

An air compressor in the form of a scavenge pump, indicated generally by the reference numeral 25 is provided for delivering a compressed air charge to the combustion chamber 24 and also for vaporizing a fuel injection spray, as will become apparent. In the illustrated embodiment, the scavenge pump 25 is of the positive displacement rotes having a pair of intermeshing rotors 26 that are driven by the engine crankshaft 17 in a known manner. The scavenge pump 25 draws atmospheric air through an inlet 27 and air filter and silencer (not shown) and discharges it through a scavenge pressure conduit 28. A manually operated throttle valve 29 is positioned in the inlet passage 27 for throttling the intake air and controlling the speed of the engine 11.

The scavenge pressure conduit 28 communicates with a scavenge manifold 30 that is formed integrally with the cylinder block 12 or which may be a separate component and which encircles the cylinder liner 13. The scavenge manifold 30 communicates with a first scavenge port 31 through a scavenge passageway 32. A pair of side scavenge passageways 33 are disposed on opposite sides of the center scavenge passageway 32 and communicate the scavenge manifold 30 with the cylinder bore 14 through scavenge ports 34.

An exhaust port 35 is formed in the cylinder liner 13 diametrically opposite to the scavenge port 31 and communicates with an exhaust passage 36 formed in the cylinder block 12 which communicates with a suitable exhaust system (not shown) for discharge of the exhaust gases to the atmosphere.

The porting arrangement described provides a so-called Schnurle scavenging for the combustion chamber 24 and causes the inlet charge to be directed generally upwardly toward the cylinder head recess 23 so as to provide good scavenging of the combustion chamber 24.

An injection port 37 which is comprised of a single or group of small orifices is formed in the cylinder liner 13 at a point above the center scavenge port 31 and are directed generally upwardly toward the combustion chamber recess 23. The injection port 37 is disposed at approximately the same height as the exhaust port 35 so that it will open substantially simultaneously with the opening of the exhaust port 35. A chamber 38 is formed in the cylinder block 12 and communicates with the injection port 37. A fuel injector 39 of any known type is disposed so as to spray into the cylinder block chamber 38.

A source of compressed, high pressure air is also supplied to the chamber 38, in this embodiment from the scavenge pump 25. To this end, there is provided a further pressure manifold 41 which encircles the cylinder block 12 and may be formed integrally with it below the scavenge manifold 30. The pressure manifold 41 communicates with an accumulator chamber 42 formed in the cylinder block 12 through a reed type check valve 43. The pressure accumulator chamber 42 communicates with the injection chamber 38 through a somewhat restricted passageway 44.

A spark plug 45 is mounted in the cylinder head 22 with its gap extending into the recess 23 at a position so as to be intersected by the spray of fuel from the injector port 37 so as to permit fuel stratification at low and mid range performance and also so as to insure that a stoichiometric mixture will be present at the ga of the spark plug 45 at the time it is fired. The spark plug 45 is fired by a suitable ignition system.

The engine 11 operates in a manner now to be described. When the previously injected charge has been fired by the spark plug 45, the piston 15 will be driven downwardly driving the crankshaft 17. As the piston 15 moves downwardly, the exhaust port 35 will be opened and, at approximately the same time, the injection port 37 will be opened. When the injection port 37 is opened, a high pressure air charge from the scavenge pump 25 will be admitted in a generally upwardly direction toward the cylinder head recess 23 to assist in exhaust gas purging. At this time, no fuel is injected by the injector 39.

As the piston 15 continues to move downwardly, eventually the scavenge ports 31 and 34 will be opened and the scavenging will be continued to be completed. In addition, the combustion chamber 24 will then become charged with a high pressure air charge. As the piston 15 moves upwardly, the injector 39 will be operated so as to inject fuel into the chamber 38. The timing and duration of this injection will depend upon the load on the engine.

When the fuel injector 39 discharges, the air pressure from the scavenge pump 25 will atomize the fuel and direct it upwardly toward the gap of the spark plug 45. This operates continues until the injection port 37 is closed although fuel injection may be terminated from the injector 39 at some time prior to the closing of the injection port 37.

The charge is continued to be compressed and then will be fired by the spark plug 45 at the appropriate timing interval. Therefore, it should be readily apparent that the fuel injector 39 due to the injection into the chamber 38 will act like an air/fuel injector but will not have the complicated construction of prior art type of air/fuel injectors. Also, stratification is possible without direct cylinder injection and hence the injector need not be designed so as to be able to withstand the high pressure and temperature in the combustion chamber 24.

Figure 2:
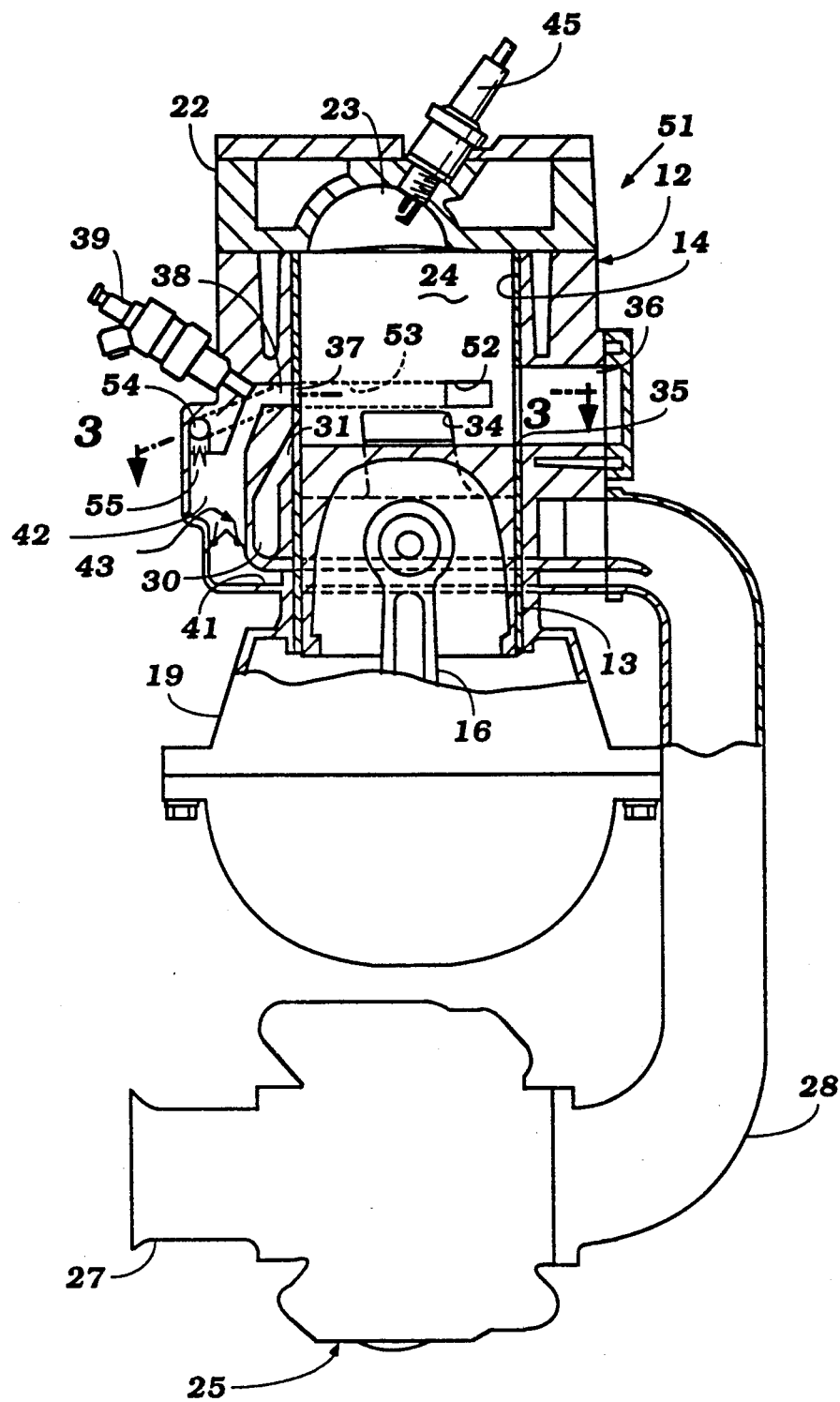
FIG. 2 is a partial cross sectional view, in part similar to FIG. 1, and shows a second embodiment of the invention.
Figure 3:
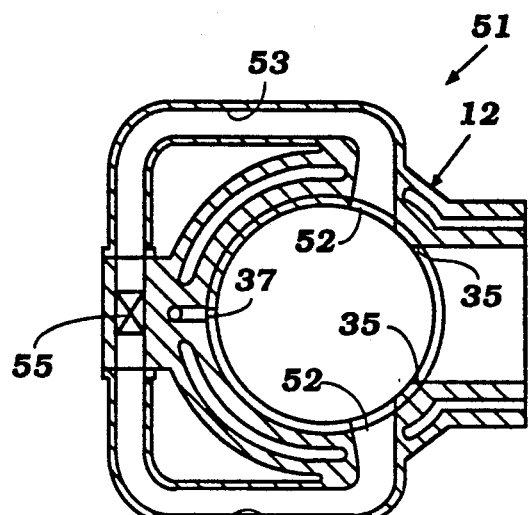
FIG. 3 is a cross sectional view taken along the line 3—3 of FIG. 2.

FIG. 2 and 3 shows another embodiment of the invention wherein the engine of this embodiment is identified generally by the reference numeral 51. In this embodiment, the engine 51 is generally of the same construction as the engine 11 of the embodiment of FIG. 1 and, therefore, components which are same or substantially the same have been identified by the same reference numerals. In this embodiment, however, rather than using a pure air charge to assist in vaporizing fuel sprayed by the fuel injector 39, the exhaust gases are employed for this purpose. This embodiment, in addition to having the injection chamber 38 communicate with the scavenge air pressure accumulator chamber 42, there is provided a pair of exhaust boost ports 52 that are positioned on diametrically adjacent sides to the main exhaust port 35. The exhaust boost ports 52 communicate with an exhaust boost manifold 53 which is formed integrally with the cylinder block 12 and which communicates with a chamber 42 that communicates also with the chamber 38. A reed type check valve 55 is provided so as to permit air pressure to flow into the manifold 53 but to preclude exhaust gases from flowing into the accumulator chamber 42. In this way, the exhaust gases also may be employed as a source of pressure for vaporizing the fuel sprayed from the injection nozzle port 37. In all other regards, this embodiment operates like the previously described embodiment.

In the embodiments of the invention as thus far described, the size and number of the nozzle ports 37, which are formed directly in the cylinder liner 13, can be chosen so as to provide the desired fuel spray and fuel amount. However, this necessitates accurate forming in the cylinder liner. An engine constructed in accordance with another embodiment is shown partially in FIG. 4 and is identified generally by the reference numeral 101. This engine has the construction of the embodiment of FIG. 1, it will be readily apparent to those skilled in the art how the invention can be employed with a construction as shown in FIG. 3. In this embodiment, a nozzle port 102 is formed in the cylinder liner 13 which has a generally larger opening than the previously described embodiment. However, a flow restricting orifice 103 similar to a metering jet is positioned in the cylinder block downstream of the chamber 38 and communicating the chamber 38 with the cylinder liner nozzle port 102 for controlling the amount of flow through this port. In this way, the flow variations can be easily changed by changing the insert orifice 103.

Figure 5:
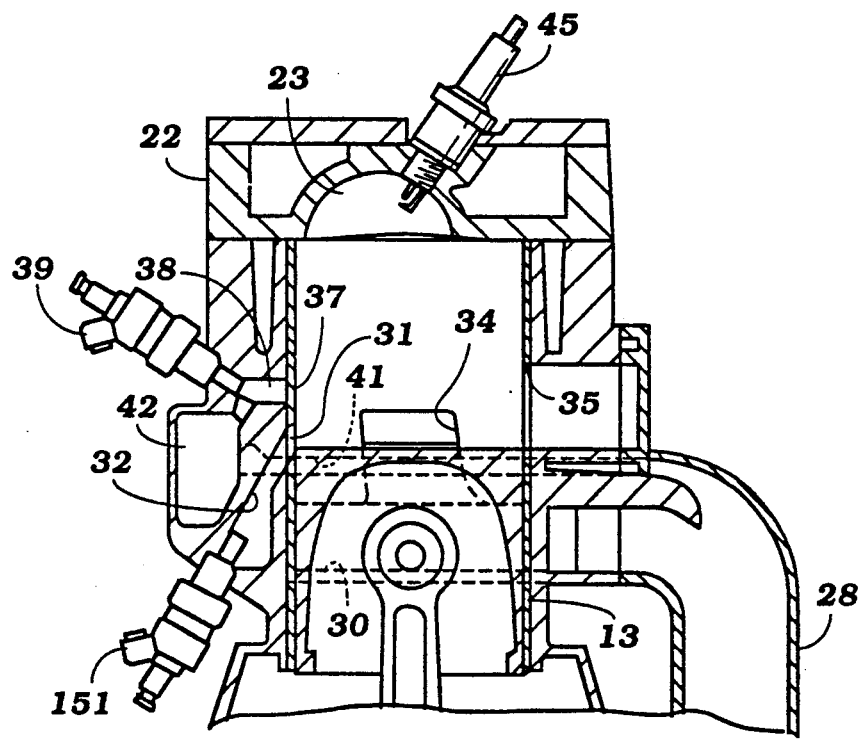
FIG. 5 is a partial cross sectional view, in part similar to FIG. 1, 2 and 4, and shows a fourth embodiment of the invention.

In the embodiments of the invention as thus far described, all of the fuel for engine operation have been supplied by the injector 39. However, it is also possible to provide an arrangement wherein at least part of the fuel supply for the engine under some running conditions is supplied by an auxiliary or supplemental fuel injector. FIG. 5 shows such an embodiment wherein there is provided a supplemental fuel injector 151. In this embodiment, the auxiliary fuel injector 151 discharges into the scavenge manifold 30 and specifically to the scavenge port 32 so that the fuel will be directed generally toward the cylinder head recess 23. Any type of desired control strategy may be employed but primarily the fuel injector 151 is utilized so as to provide additional fuel for maximum speed and load conditions. Of course, the supplemental fuel injector 151 could be positioned anywhere else in the engine and/or its induction system so as to spray fuel directly into the combustion chamber or into the induction system.

All of the embodiments of the invention as thus far described, the scavenge air has been provided by a separate scavenge pump 25 which in the illustrated embodiments has been a positive displacement type of pump. It should be readily apparent, however, that other forms of scavenge compressors may be employed and, in fact, the invention may also be utilized, in some instances, in conjunction with arrangements wherein the crankcase chambers 18 are themselves used as the pumping device. This is not the case in the embodiments thus far described and, for that reason, the crankcase chambers 18 of the previously described embodiments may be provided with a suitable atmospheric vent so that the change in volume of the chambers 18 during the reciprocation of the piston 15 will not cause any significant pumping losses. In addition, the crankcase chambers 18 of the previously described embodiments may be partially filled with lubricant so that the engines of these embodiments and specifically the crankshaft 17 and journals of the connecting rod 16 can be lubricated in a system similar to four cycle engines. Preferably, some form of splash lubrication system is employed.

Figure 6:
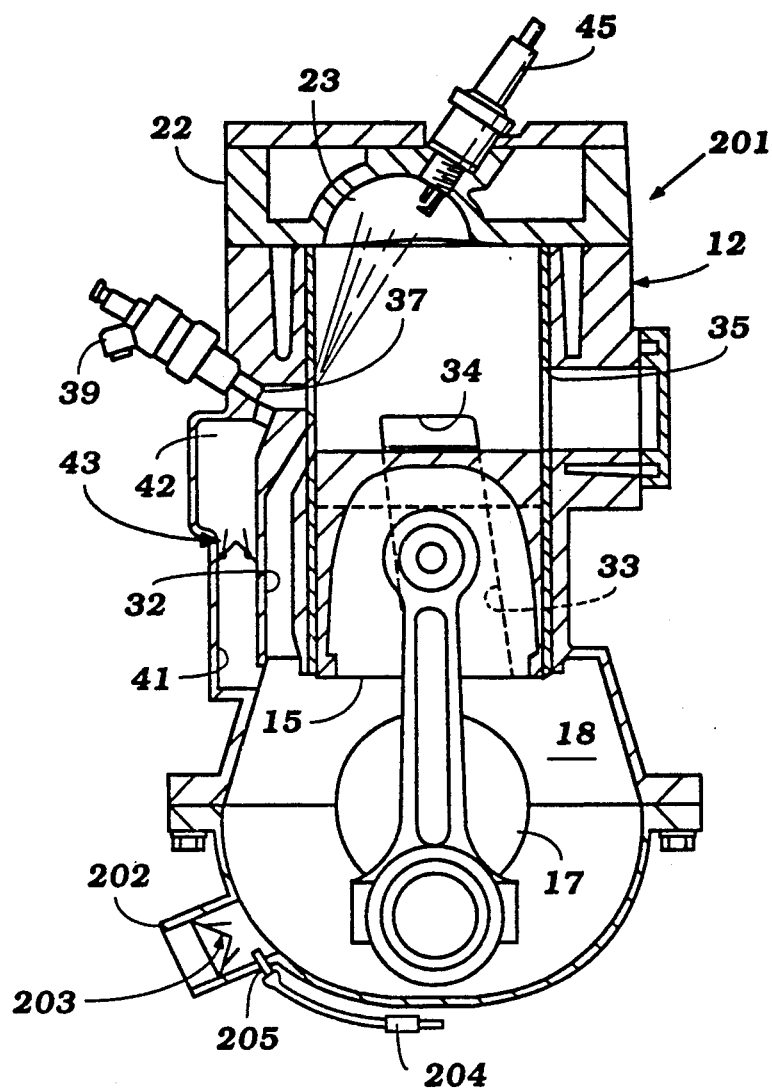
FIG. 6 is a cross sectional view, in part similar to FIGS. 1, 2, 4 and 5, and shows a fifth embodiment of the invention.

FIG. 6 shows an embodiment wherein the actual pressure differences in the crankcase chamber 18 are employed for pressurizing the injection chamber 38 and also for supplying the scavenge ports 31 and 34. However, the basic construction of the engine, indicated generally by the reference numeral 201 in this embodiment, is the same as the embodiment of FIG. 1. For that reason, components which are the same have been identified by the same reference numerals and will be described again only insofar as is necessary to understand the construction and operation of this embodiment.

In this embodiment, the scavenge manifold 30 is eliminated and the scavenge passages 32 and 33 communicated directly with the crankcase chamber 18 of the respective cylinder. In addition, the injection manifold 41 communicates also with the crankcase chambers 18.

An atmospheric air port 202 is provided that communicates the crankshaft chamber 18 with the atmosphere through an air cleaner/air silencer arrangement (not shown) and a reed type check valve 203 is positioned in this passage, as is typical with two cycle, crankcase, compression engines. The charge drawn into the crankcase chambers 18 is then compressed and delivered both to the scavenge passages 32 and 33 and injection passage 41 so as to provide the effects previously noted.

This engine 201 may also be provided with a lubricating system including a lubricant pump 204 that delivers lubricant under pressure to the atmospheric inlet 202 downstream or upstream of the check valve 203 through a lubricant injector nozzle 205.

Figure 7:
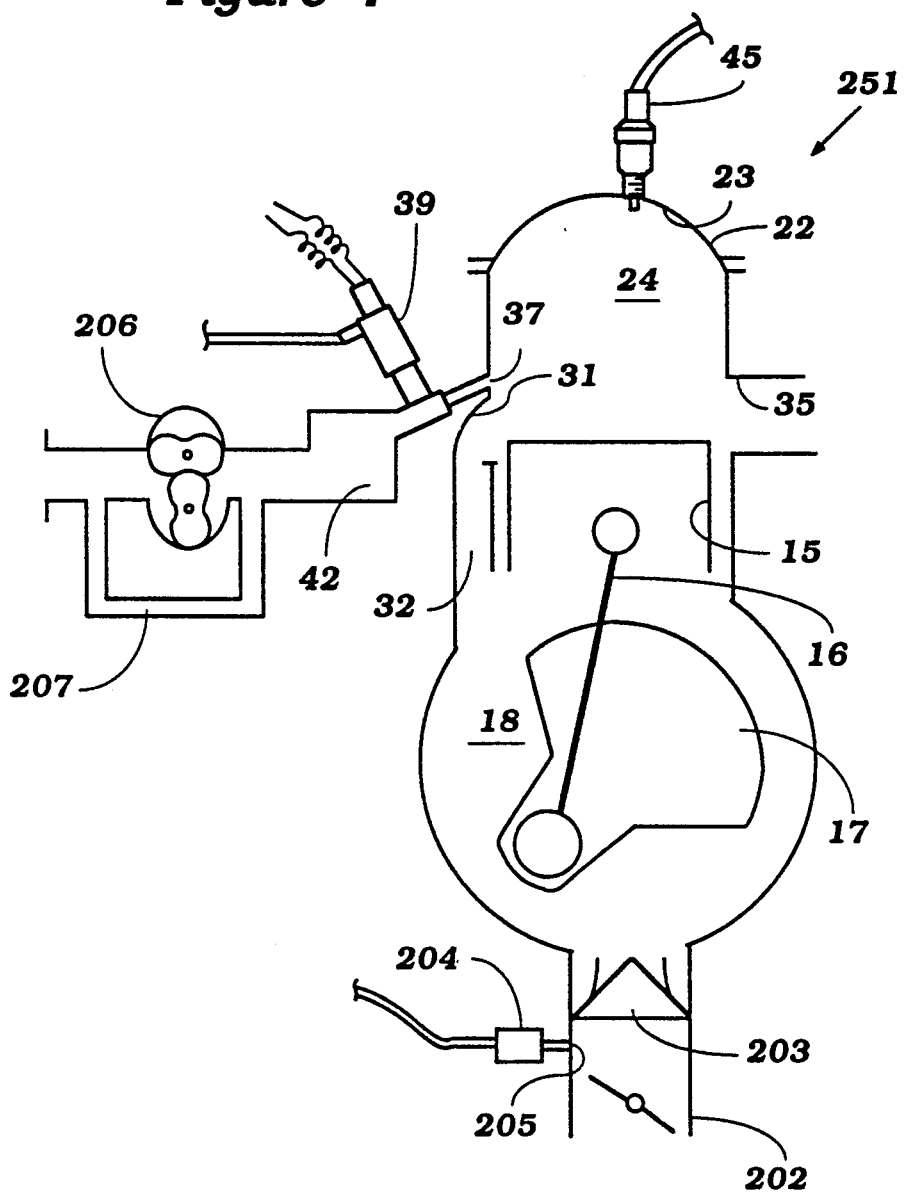
FIG. 7 is a partially schematic cross sectional view of a sixth embodiment of the invention.

FIG. 7 shows another embodiment of the invention which is generally similar to the embodiment of FIG. 1 but wherein the engine constructed in accordance with this embodiment is identified generally by the reference numeral 251. Again, where the engine 251 has a construction the same as or similar to the previously described embodiments, components of it have been identified by the same reference numerals as applied to previous components.

It should be noted that the engine 251 has its scavenging system constructed in a conventional scavenging system for a two cycle, crankcase, compression engine and, therefore, the atmospheric air inlet 202, reed type check valve 203, and lubrication system of the embodiment of FIG. 6 have been illustrated and identified by the same reference numerals.

In this embodiment, an injection air compression pump 206 which can be of a smaller capacity than the scavenge pumps 25 of the previous embodiments, is provided for supplying air only to the accumulator chamber 42 associated with the fuel injection system. A by-pass passageway 207 is incorporated between the inlet and outlet sides of the scavenge pump 206 so as to relieve pressure when the injector port 37 is closed. Hence, this embodiment achieves all of the advantages of embodiments of FIGS. 1 through 5 but does not necessitate the use of as large a pump. However, the pressure scavenging of this embodiment will not be as effective as the embodiments using a larger scavenge pump.

Figure 8:
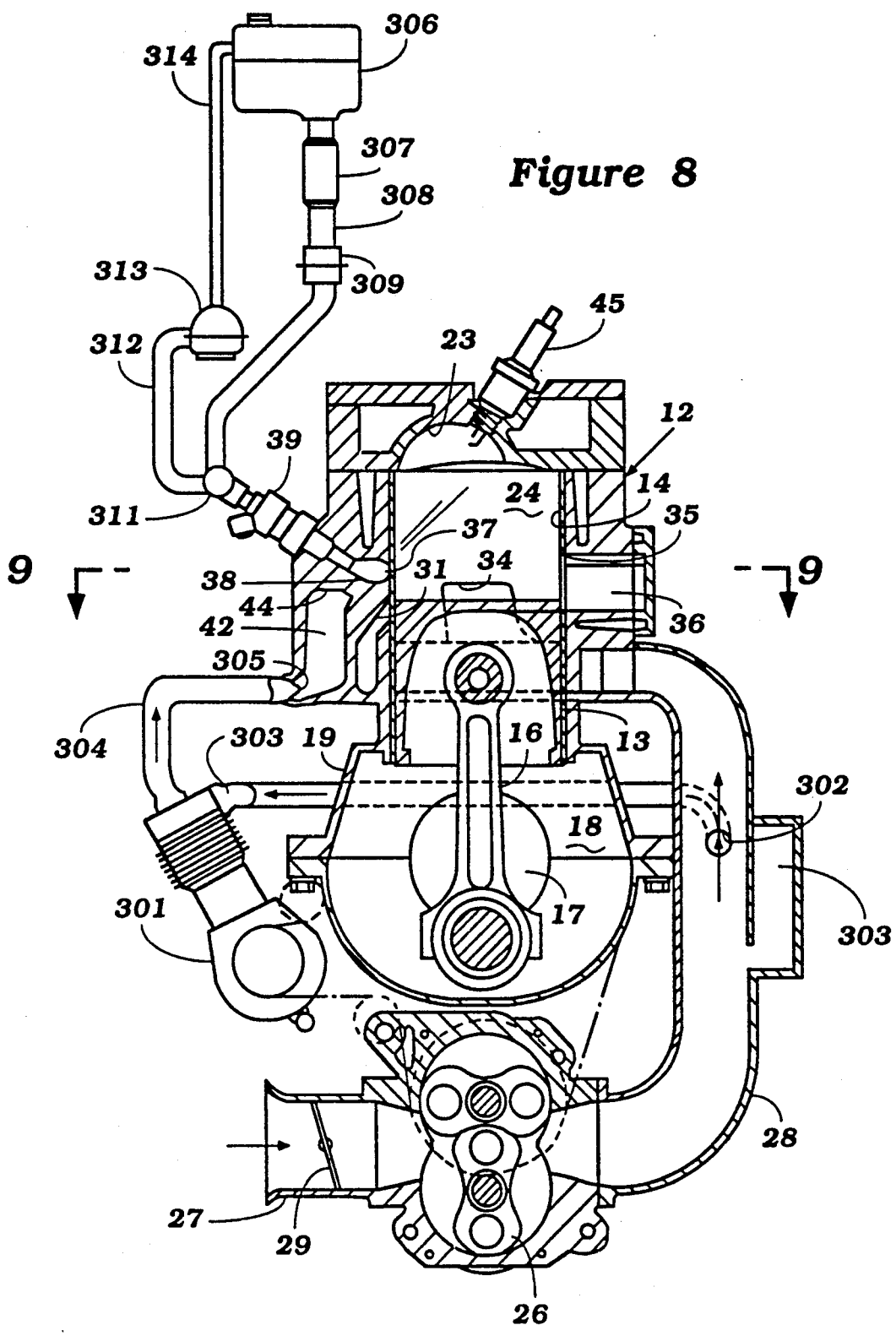
FIG. 8 is a cross sectional view, in part similar to FIGS. 1, 2, 4, 5 and 6 and shows a seventh embodiment of the invention.
Figure 9:
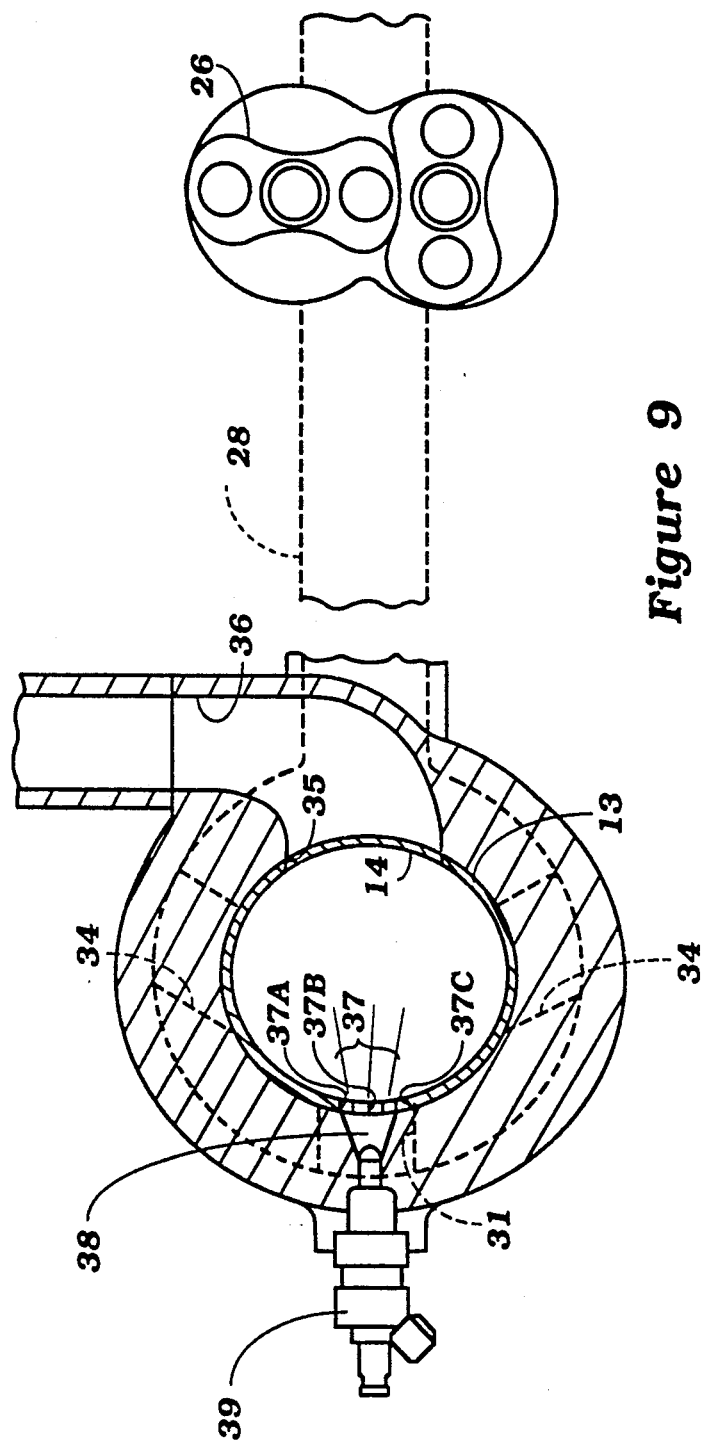
FIG. 9 is a cross sectional view taken along the line 9—9 of FIG. 8 with the scavenge pump being shown out of its true relationship to illustrate it in the system.
Figure 10:
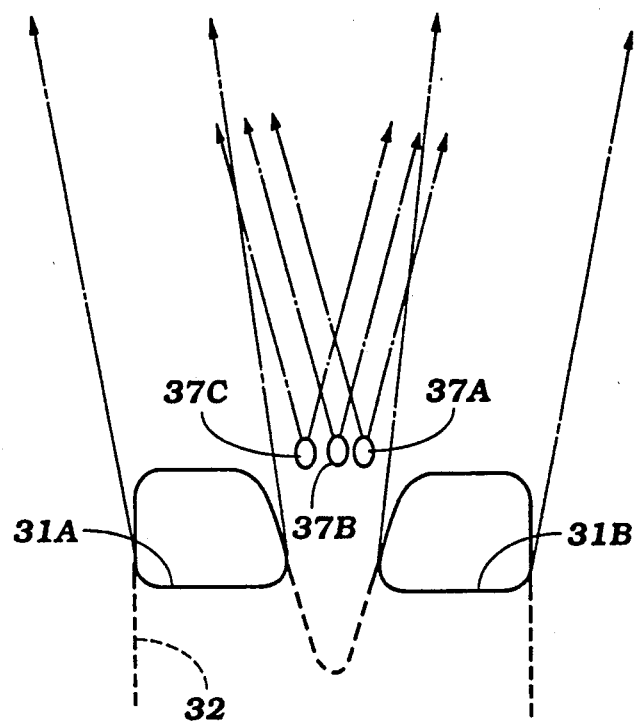
FIG. 10 is a developed view showing the relationship of the nozzle ports to the center or main scavenge port of this embodiment.
Figure 11:
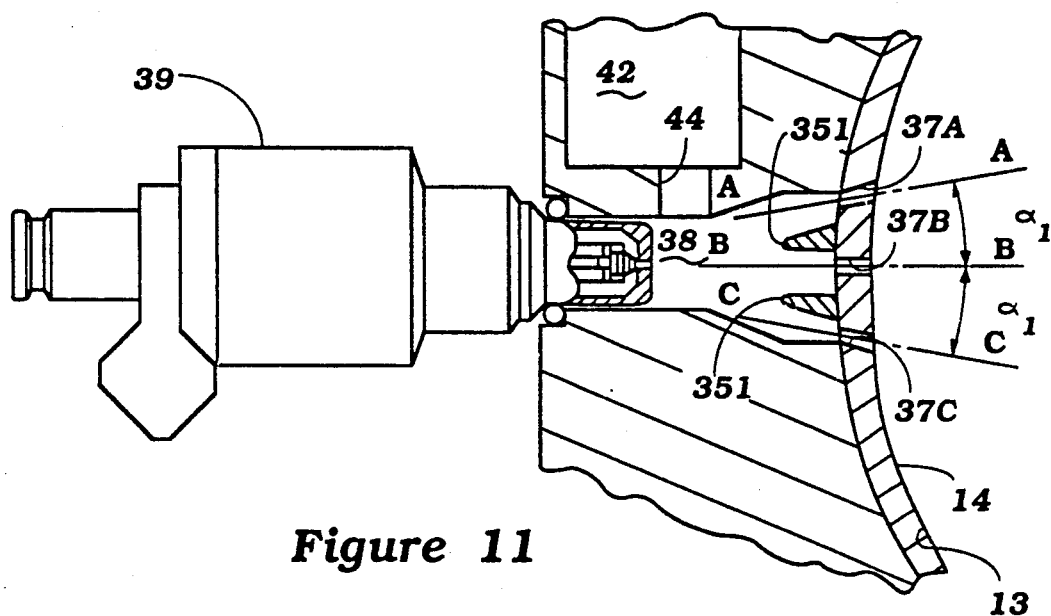
FIG. 11 is an enlarged cross sectional view taken along a plane similar to that of FIG. 9 and shows another embodiment of way in which the injection nozzle ports may be arranged.

FIGS. 8 through 10 show another embodiment of the invention which is generally similar to the embodiment of FIG. 1. For that reason, components of the engine in this embodiment which are the same as that of the embodiment of FIG. 1 have been identified by the same reference numerals and will not be described again, except insofar as is necessary to understand the construction and operation of this embodiment.

In the embodiment of FIG. 1, the scavenge pump 25 was employed as the means for pressurizing air for the chamber 42 to assist in the fuel injection from the nozzle port 37. However, there may be times when it is desired to provide a higher pressure than the pressure supplied by the scavenge pump 25 and this embodiment shows one way in which this may be done. In this embodiment, an air compressor 301 is driven from the crankshaft 17 along with the scavenge pump 25. The air compressor 301 draws pressurized air from the intake manifold 28 through an inlet port 302. A damping resonator chamber 303 is positioned downstream of the port 302 so as to maintain more uniform pressure of air passing through the port 302 through a conduit 303 to the compressor 301. The compressor 301 then discharges to the accumulator chamber 42 through a delivery conduit 304. A check valve 305 controls the communication of the delivery conduit 304 with the accumulator chamber 42.

It should be noted that this figure also shows the fuel system employed with the fuel injector 39. This fuel system includes a fuel tank 306 that supplies fuel to a high pressure pump 307 which is driven in a suitable manner and which delivers the fuel to a conduit 308 in which a filter 309 is provided. The conduit 308 delivers fuel to a fuel manifold 311 which communicates with the injectors 39. A by-pass passageway 312 in which a pressure regulator 313 is positioned for returning fuel back to the tank 306 through a relief conduit 314 so as to maintain the desired fuel pressure in the manifold 311.

It has been previously noted that the nozzle port 37 may constitute a series of small holes. FIGS. 9 and 10 show how these small holes may be oriented in accordance with one feature of the invention so as to provide a wider spray path than is possible from conventional injection nozzles and also which will insure that the fuel particles from the respective openings do not impinge upon each other and thus form larger fuel droplets rather than insuring good atmosphization of the fuel.

In this embodiment, the nozzle port 37 includes three individual port openings 37A, 37B, and 37C which are disposed in this embodiment in side by side relationship as best seen in FIG. 10 which is a projected view of the cylinder liner 13. In this embodiment, the nozzle ports 37A, 37B and 37C are all disposed at substantially the same height and are disposed so as to spray at substantially the same upward angle into the cylinder bore 14. However, because of the circumferential spacing the fuel spraying from them, as may be seen in FIG. 10, will not impinge upon the spray from adjacent of the ports 37A, 37B or 37C and cause larger particles to form.

Furthermore, in this embodiment, the main scavenge port 31 is divided into two sections 31A and 31B which are circumferentially spaced from each other with the nozzle ports 37A, 37B and 37C being formed between them and opened at a slightly earlier time than the main scavenge ports 31A and 31B open. As a result of this relationship, the air charge issuing from the scavenge ports 31A and 31B will not immediately impact upon the fuel issuing from the nozzle ports 37A, 37B and 37C and hence the fuel spray will not be so widely dispersed at to adversely affect the fuel stratification. In addition, the high flow velocity of the scavenge air entering through the ports 31A and 31B will not sweep the fuel from the nozzle ports 37A, 37B and 37C directly to the exhaust port 35. Hence, hydrocarbon emissions can be substantially reduced with such an arrangement.

FIG. 11 through 14 show another embodiment of the which is generally similar to the embodiment of FIGS. 8 through 10. In this embodiment, however, the small nozzle ports 37A, 37B and 37C do not extend parallel to each other. Rather, the center nozzle port 37B is directed in a radial direction while the ports 37A and 37C are disposed at angles α to the center port 31B so that the ports diverge from each other in a radial direction.

Figure 12:
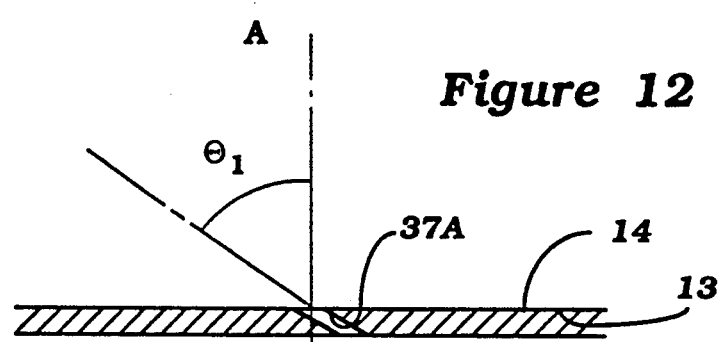
FIGS. 12 through 14 are cross sectional views taken along the planes AA, BB, and CC of FIG. 11 showing the angular disposition of the individual nozzle ports relative to the cylinder bore axis.
Figure 13:
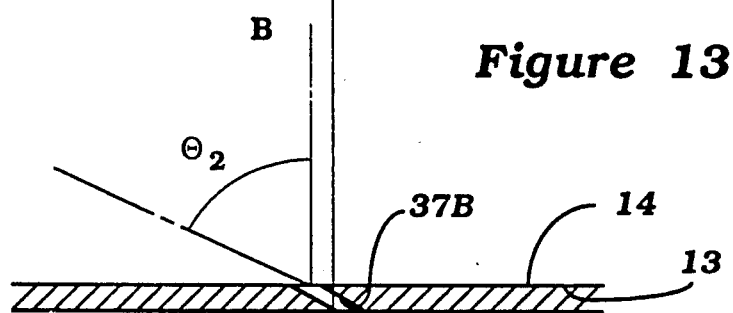
Figure 14:
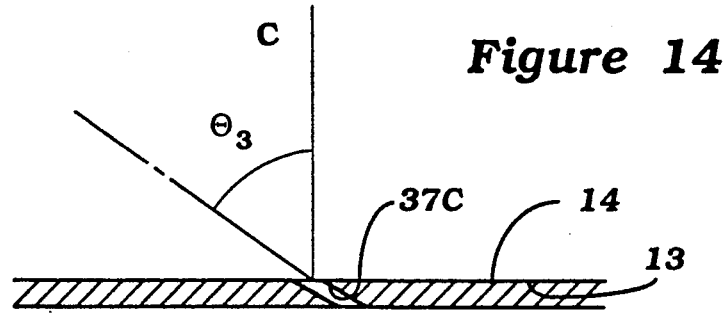

In addition and as best shown in FIGS. 12 through 14, the center nozzle port 37B is disposed at an angle $\theta_2$ to a line perpendicular to the cylinder bore axis which angle $\theta_2$ is greater than the angles $\theta_1$ and $\theta_3$ between the nozzle ports 37A and 37B and this radial line. Hence, the nozzle port 37B will direct its flow more upwardly than the ports 37A and 37C and there will be less likelihood of impingement of the fuel flowing from the ports 37A, 37B and 37C on each other, particularly in that the areas where these ports open through the cylinder bore 14.

In this embodiment, the injection chamber 38 upstream of the nozzle ports 37A, 37B and 37C is provided with a pair of dividing walls 351 which will separate the fuel sprayed into the chamber 38 from the fuel injector 39 so that the fuel flows from the center lines of the nozzle ports 37A, 37B and 37C to further insure against impingement of the fuel issuing from the nozzle ports 37A 37B and 37C on each other.

In this embodiment, the nozzle 37B is slightly higher than the nozzle ports 37A and 37C as also show in FIGS. 12 through 14 so the nozzle port 37B will open before and close after the remaining ports 37A and 37C.

Figure 15:
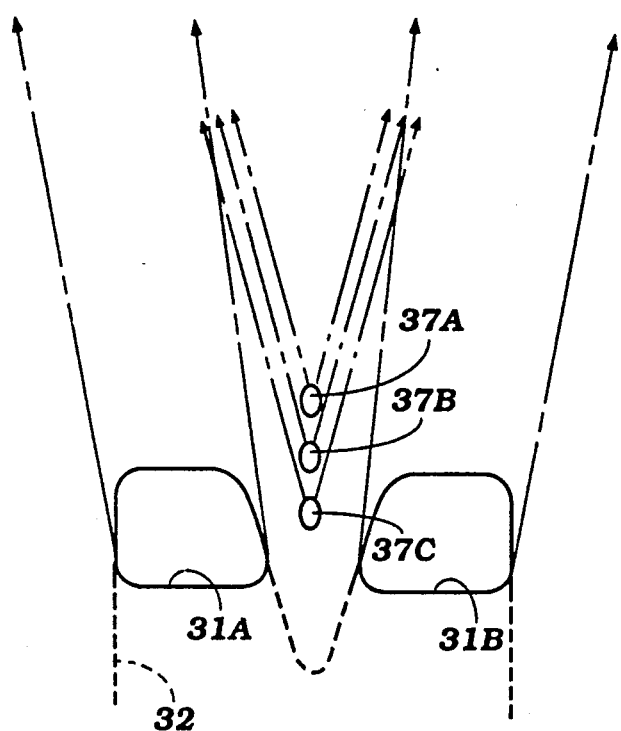
FIG. 15 is a developed view, in part similar to FIG. 10, and shows another possible arrangement for the nozzle ports.

In the embodiments as thus far described, the nozzle ports 37A, 37B and 37C have all been disposed generally at the same axial position along the length of the cylinder bore axis but have been circumferentially spaced. FIG. 15 shows another embodiment of the invention wherein the nozzle ports 37A, 37B and 37C are all disposed at the same radial position around the cylinder bore axis but are vertically positioned along the length of the axis from each other. Hence, the port 37A will open before and close after the ports 37B and 37C and the port 37B will open and close before the port 37C. In the illustrated embodiment, the port 37A opens before the scavenge ports 31A and 32B are opened, the port 37B will open at about the same time that the scavenge ports 31A and 32B open and the port 37C will open after the scavenge ports 31A and 32B are opened. Closure, of course, occurs in the opposite sequence. Again, the positioning of the nozzle ports 37A, 37B and 37C is such that the fuel issuing from them will not impinge close to the openings of the nozzle ports and hence larger particles will not be formed and fuel vaporization will be improved.

Figure 16:
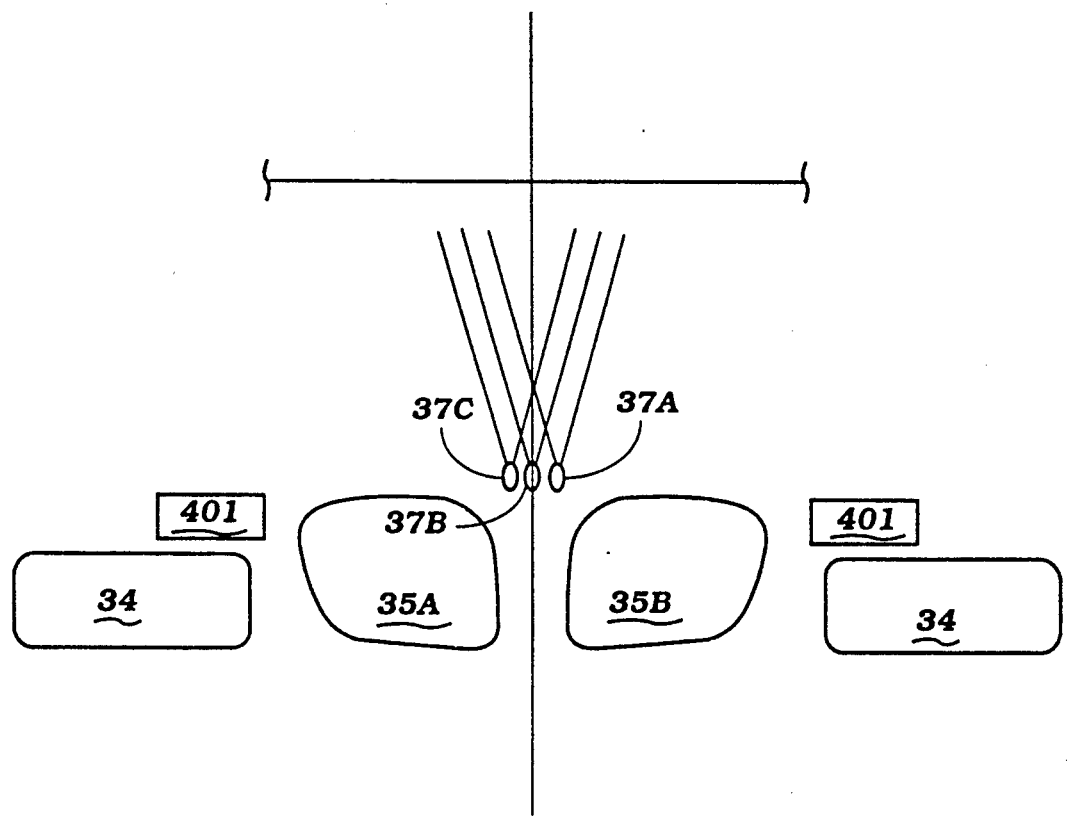
FIG. 16 is a further developed view, in part similar to FIGS. 10 and 15, and shows another relationship for the nozzle ports in relation to the intake and exhaust ports.

In all of the embodiments as thus far described, the nozzle port 37 or ports in the case plural ports are employed, has been juxtaposed to the main scavenge passage 31. As a result, the fuel is introduced in the same general direction as the flow of scavenge air into the combustion chamber. In some instances it may be desireable to have the fuel flow in an opposite direction so as to insure against any fuel being swept out of the exhaust port 35. FIG. 16 shows such a embodiment. In this embodiment, the exhaust port 35 is divided into two exhaust ports 35A and 35B which are circumferentially spaced with the nozzle ports 37A, 37B and 37C being positioned between them. This again insures against the likelihood that the air flow will cause any fuel to be swept from the exhaust ports 35A and 35B. In this embodiment, also, there are provided a pair of sub-exhaust ports 401 which are circumferentially spaced from the main exhaust ports 35A and 35B and which slightly overlap the side scavenge ports 34.

With a configuration wherein the nozzle ports 37A, 37B and 37C are disposed adjacent the exhaust ports 35A and 35B any of the previously described spacings may be employed. That is, the nozzle ports 37A, 37B and 37C may be circumferentially spaced and spray at different angles or may be aligned circumferentially and positioned axially one above the others, as shown in the embodiment of FIG. 15.

Figure 17:
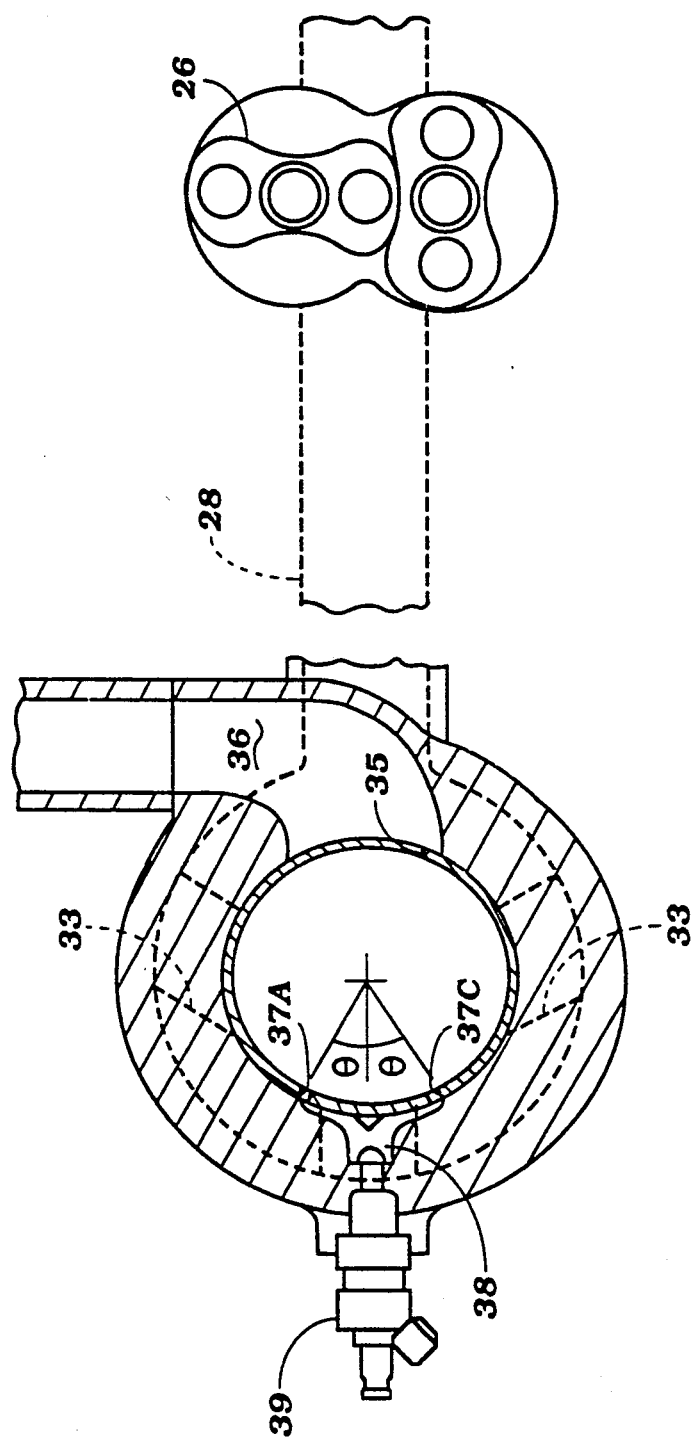
FIG. 17 is a cross sectional view, in part similar to FIG. 9, and shows a further way in which the nozzle ports may be arranged.
Figure 18:
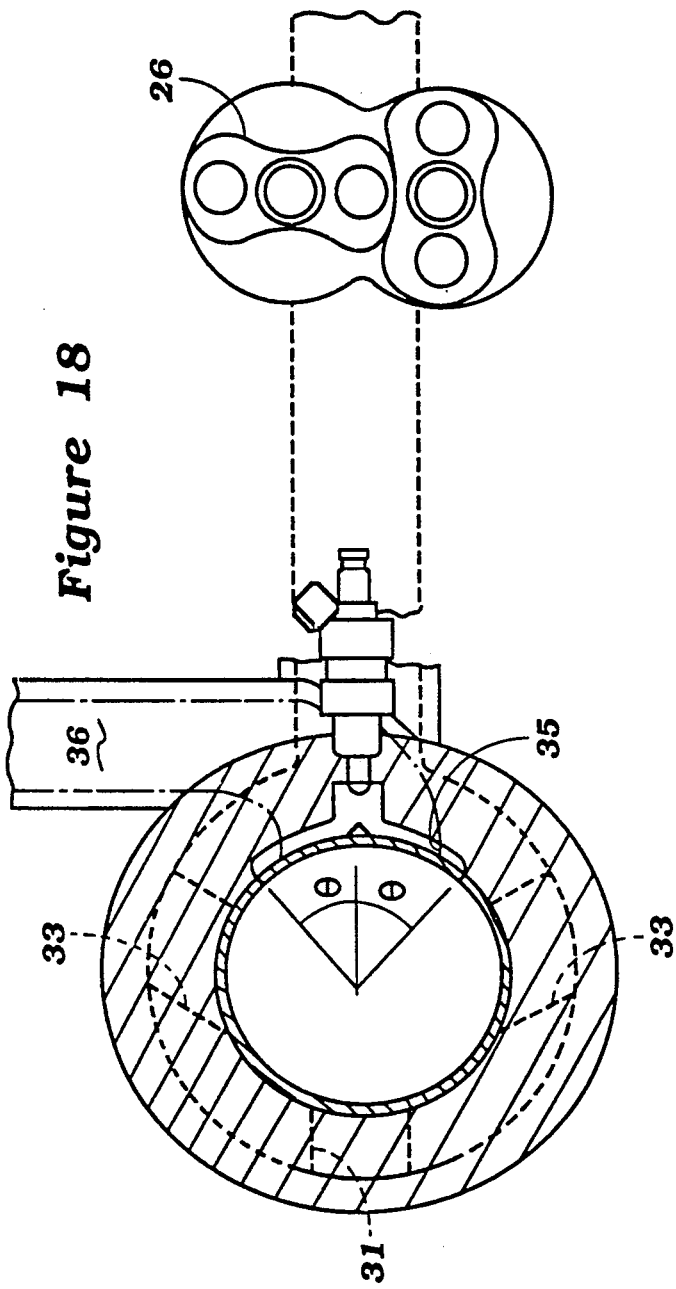
FIG. 18 is a cross sectional view, in part similar to FIGS. 9 and 17, and shows a still further way in which the nozzle ports may be dispersed.

In all of the embodiments as thus far described, the plural nozzle ports 37A, 37B and 37C have been disclosed closely adjacent each other. However, with this type of fuel injection system, it is possible to have the nozzle ports spaced a larger distance from each other than as previously described and FIGS. 17 and 18 show to such embodiments. In FIG. 17, the relationship of the nozzle ports is on the scavenge port side of the engine, as with the embodiments of FIGS. 1 through 15 while in the embodiment of FIG. 18 the nozzle ports are disposed on the exhaust port side of the cylinder. However, in each instance the nozzle ports, there being two such ports as indicated at 37A and 37C, are disposed between the side scavenge ports 34 and either the center or main scavenge port 38 as in the embodiment of FIG. 17 or the exhaust port 35 as in the embodiment of FIG. 18. In these embodiments, the ports 37A and 37C are spaced at a greater angle from the center scavenge 31 or exhaust 35 port.

Figure 19:
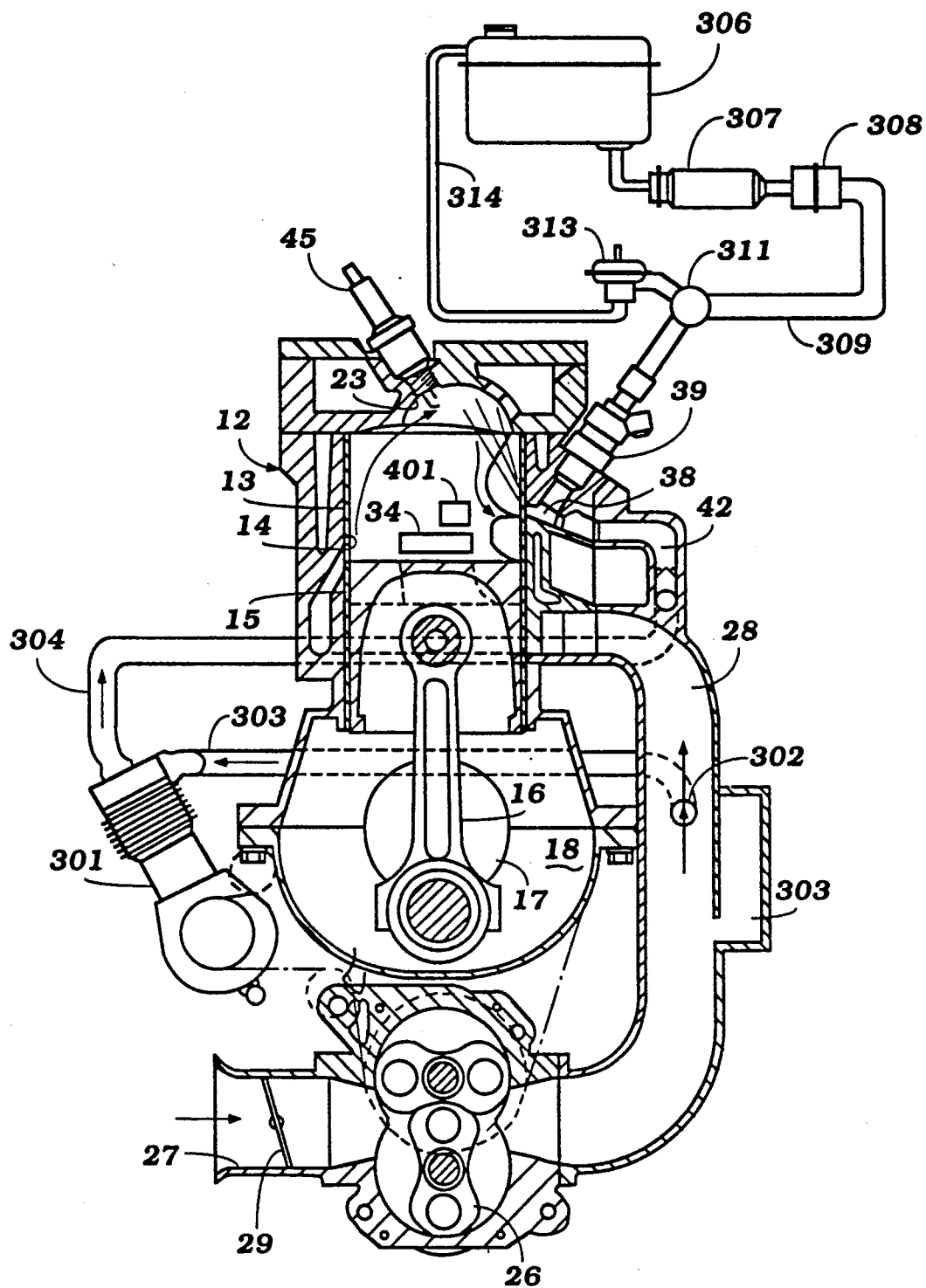
FIG. 19 is a cross sectional view, in part similar to FIGS. 1, 2, 4, 5, 6 and 8 showing how the embodiment of FIG. 18 relates to the remaining components of the engine in this embodiment and how the fuel is dispersed.

FIG. 19 is a cross sectional view in part similar to FIG. 1 and shows how the fuel will be dispersed from the nozzle ports when they are disposed adjacent the exhaust port 35. It will been seen that the fuel patch that issues from these ports will flow upwardly toward the combustion chamber recess. When the nozzle ports 37 are disposed on the exhaust port side of the engine, then the combustion chamber recess 23 should be offset from the cylinder bore axis toward this side. Since FIG. 19 otherwise conforms to the construction as shown in FIG. 8 except for the location of the combustion chamber recess 23 and the location of the nozzle ports 37 the same reference numerals have been employed for indicating the respective parts.

Figure 20:
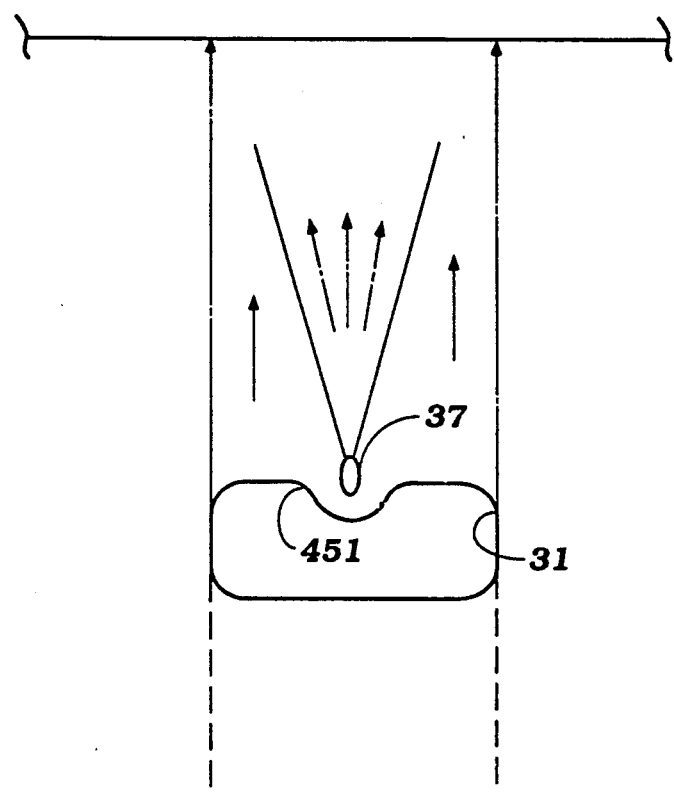
FIG. 20 is a developed view showing another possible relationship between the nozzle port and one of the scavenge ports.

FIG. 20 shows another embodiment of way in which the injection port 37 may be associated with the adjacent scavenge or exhaust port, this embodiment showing the relationship to the main scavenge port 31. In this embodiment, the main scavenge port is formed with a downwardly extending projection 451 in its central area and the injection port 37 is formed in this downwardly extending projection. Thus, the injection port 37 in this embodiment functions as if it were formed in effect in the central portion of the main scavenge port 31.

Figure 4:
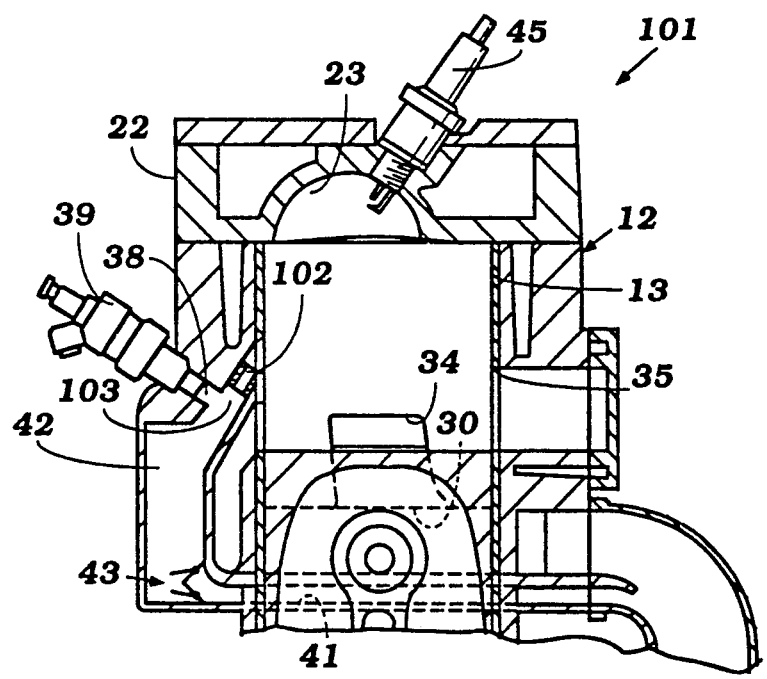
FIG. 4 is partial cross sectional view, in part similar to FIGS. 1 and 2, and shows a third embodiment of the invention.

In all of the embodiments previously described except for the embodiment of FIG. 4, the injection port has been formed primarily as a bore through the cylinder lining 13. As a result, the outer periphery of the injection port lies in the portion of the lining 13 that defines the cylinder bore 14. With such an arrangement, there may be some tendency for the fuel issuing from the injection port 37 to deposit itself on the cylinder bore 14 and flow slowly as a liquid up the cylinder liner. This is, of course, not particularly desireable.

Figure 21:
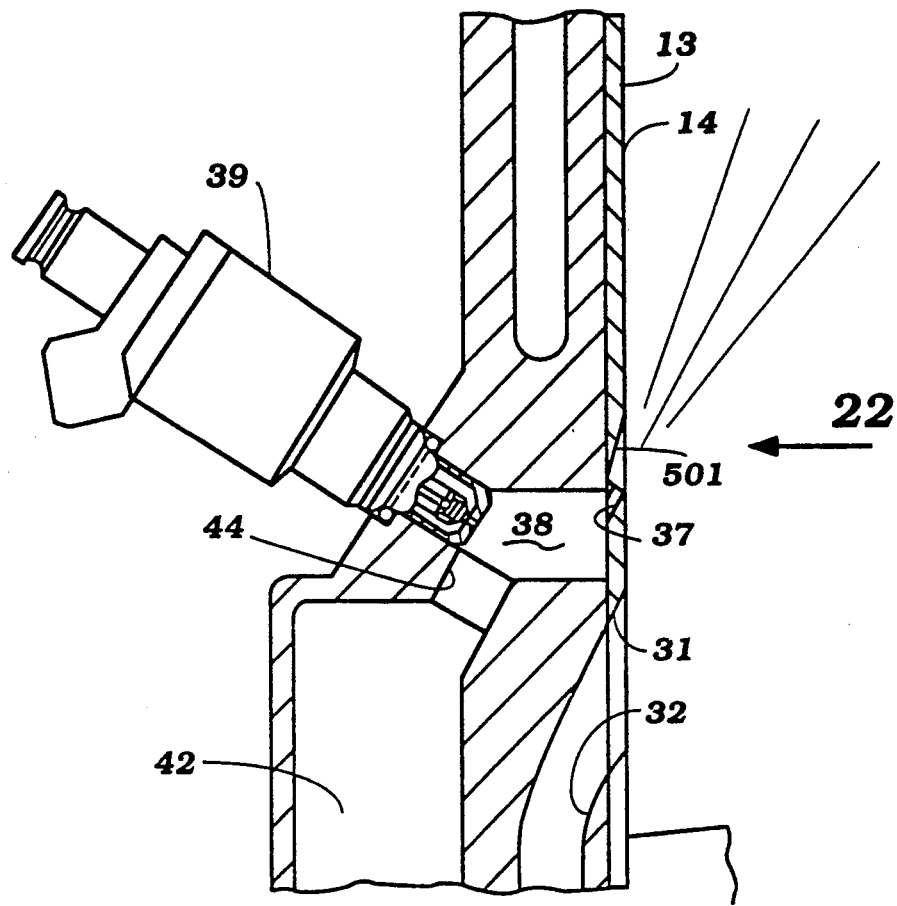
FIG. 21 is a further enlarged cross sectional view, in part similar to FIGS. 1, 2, 4, 5, 6, 8 and 19 and shows another embodiment of the invention.
Figure 22:
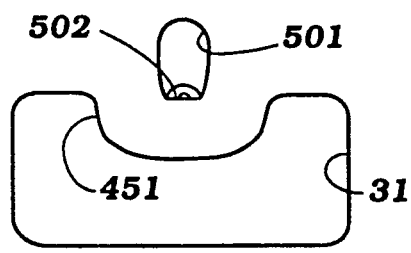
FIG. 22 is a developed view showing the relationship of the injector port to the scavenge port in this embodiment.

In the embodiment of FIGS. 21 and 22 show a way in which the outer periphery of the injection port 37 may cooperate with a recess, indicated generally by the reference numeral 501 that is formed in the cylinder liner 13 and specifically in the cylinder bore wall 14. In this embodiment, the injector port 37 extends out of a lower wall 502 formed by the recess 501 and hence has an effectively a triangular shape opening and any liquid which may condense on the wall of the recess 501 will be swept upwardly and dispersed with the air flow from the scavenge port. In this embodiment, the scavenge port 31 has a projecting portion 451 which is substantially wider than the projection of the previously described embodiment of FIG. 20.

Figure 23:
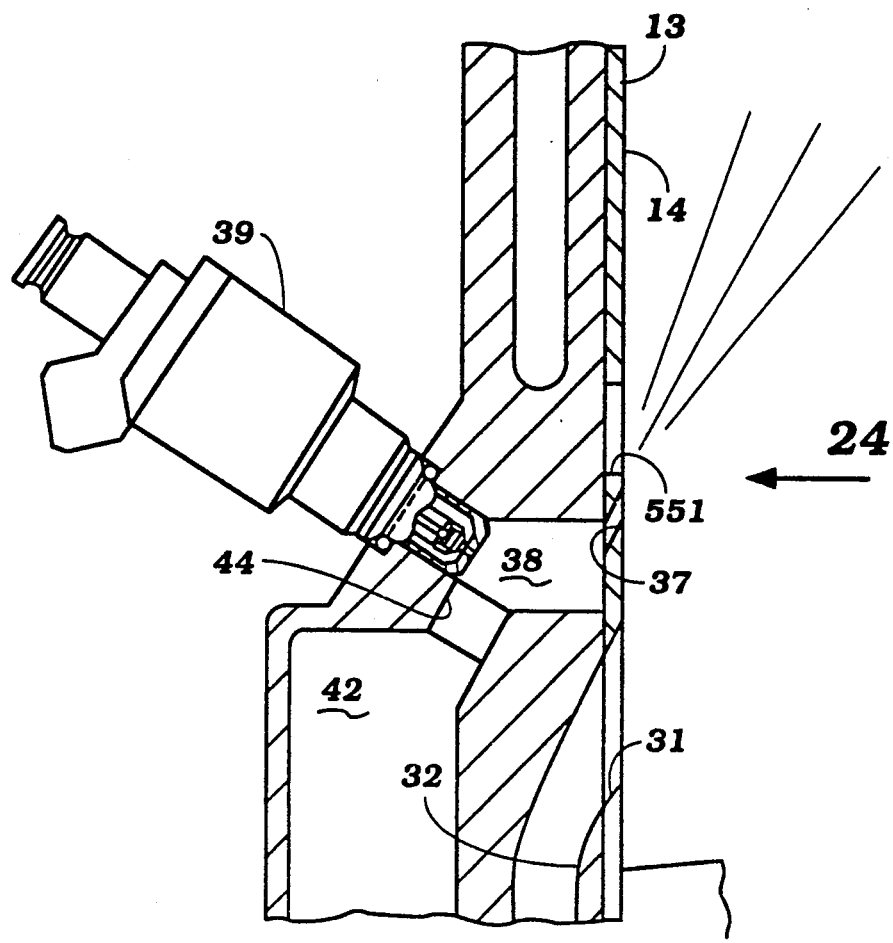
FIG. 23 is an enlarged cross sectional view, in part similar to FIG. 21, and shows another arrangement of the injector port and scavenge port.
Figure 24:
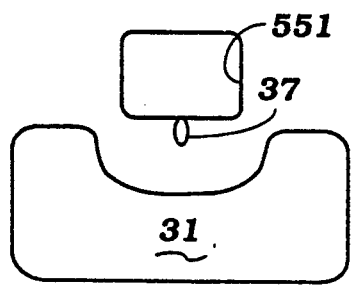
FIG. 24 is a developed view of the nozzle port and scavenge port of this embodiment.

FIGS. 23 and 24 show another embodiment that provides an arrangement for insuring against a stream fuel flowing up the cylinder bore 14 from the injection port 37. In this embodiment, a generally rectangular shape recess 551 is formed in the cylinder liner 13 above the injector port 37 and may be intersected by the upper tip of the injector port 37 as shown in FIG. 24. Again, any fuel that tends to migrate up the cylinder bore 14 will flow into the recess 551 and then be swept by the air flow to again vaporize.

I should be readily apparent from the foregoing description that the described embodiments of the invention provide an extremely good injection system which incorporate the advantages of fuel/air injectors and of direct cylinder injection without carrying over the disadvantages of these systems. Of course, the foregoing description is that of preferred embodiments of the invention and various changes and modifications may be made without departing from the spirit and scope of the invention, as defined by the appended claims.

We claim

1. A fuel injection system for an internal combustion engine having a variable volume combustion chamber defined by a pair of relatively moveable components, a nozzle port extending through one of said components and opened and closed only by the relative movement of said components, a conduit having a cross section flow area substantially greater than said nozzle port formed at least in part by said one component and extending to said nozzle port from externally of said combustion chamber, means for delivering a pressurized gas to said conduit at least during a portion of the time when said nozzle port is opened, and a fuel injector for injecting fuel into said conduit.

2. A fuel injection system as set forth in claim 1 wherein the nozzle port is formed by an opening in the wall of the member which defines a portion of the combustion chamber.

3. A fuel injection system as set forth in claim 2 wherein the nozzle port comprises a plurality of nozzle ports, each communicating with the conduit.

4. A fuel injection system as set forth in claim 3 wherein the nozzle ports are spaced from each other transversely to the direction of relative movement of the components.

5. A fuel injection system as set forth in claim 4 wherein the nozzle ports are also spaced from each other in the direction of relative movement so that they will be opened and closed at different times.

6. A fuel injection system as set forth in claim 3 wherein the nozzle ports are spaced from each other in the direction of relative movement so they will be opened and closed at different times from each other.

7. A fuel injection system as set forth in claim 6 wherein the nozzle ports are generally aligned in the direction of relative movement.

8. A fuel injection system as set forth in claim 3 wherein the nozzle ports are disposed to inject fuel at a different angle relative to each other for precluding impingement of fuel issuing from one of the nozzle ports with the fuel issuing from another of nozzle ports.

9. A fuel injection system as set forth in claim 2 further including flow restricting means in the conduit upstream of the nozzle port for controlling the amount of fuel delivered to the combustion chamber.

10. A fuel injection system as set forth in claim 1 wherein the fuel injector injects fuel into an accumulator chamber formed in the conduit.

11. A fuel injection system as set forth in claim 10 wherein the nozzle port comprises a plurality of nozzle ports, each communicating with the conduit.

12. A fuel injection system as set forth in claim 11 wherein the nozzle ports are transversely spaced from each other in the direction of relative movement of the components.

13. A fuel injection system as set forth in claim 12 wherein the nozzle ports are also spaced from each other in the direction of relative movement so that they will be opened and closed at different times.

14. A fuel injection system as set forth in claim 11 wherein the nozzle ports are spaced from each other in the direction of relative movement so they will be opened and closed at different times from each other.

15. A fuel injection system as set forth in claim 14 wherein the nozzle ports are generally aligned in the direction of relative movement.

16. A fuel injection system as set forth in claim 11 wherein the nozzle ports are disposed to inject fuel at a different angle relative to each other for precluding impingement of fuel issuing from one of the nozzle ports with the fuel issuing from another of nozzle ports.

17. A fuel injection system as set forth in claim 1 wherein the means for delivering pressurized gas to the conduit comprises means for delivering pressurized atmospheric air.

18. A fuel injection system as set forth in claim 17 wherein the means for delivering pressurized air comprises an air compressor.

19. A fuel injection system as set forth in claim 18 wherein the air compressor is driven by the engine.

20. A fuel injection system as set forth in claim 19 further including a second air compressor for further compressing the air compressed by the first mentioned air compressor.

21. A fuel injection system as set forth in claim 17 wherein the air compressor comprises another variable volume chamber formed by the pair of relatively moveable components.

22. A fuel injection system as set forth in claim 1 wherein the means for delivering a pressurized gas comprises means for delivering exhaust gases from the combustion chamber to the conduit.

23. A fuel injection system as set forth in claim 1 wherein the combustion chamber includes a combustion recess and further including a spark plug positioned in the combustion recess and wherein the nozzle port is directed toward the spark plug.

24. A fuel injection system as set forth in claim 1 further including an exhaust port communicating with the variable volume chamber and opened and closed by the relatively moveable components.

25. A fuel injection system as set forth in claim 11 wherein the timing of opening of the exhaust port and of the nozzle port is substantially the same.

26. A fuel injection system as set forth in claim 25 wherein the nozzle port is disposed contiguous to the exhaust port.

27. A fuel injection system as set forth in claim 26 wherein the nozzle port comprises a plurality of nozzle ports, each communicating with the conduit.

28. A fuel injection system as set forth in claim 27 wherein the exhaust port is divided into a pair of exhaust ports disposed on transverse sides of the nozzle ports in the direction of relative movement of the components.

29. A fuel injection system as set forth in claim 27 wherein the nozzle ports are disposed on opposite sides of the exhaust port.

30. A fuel injection system as set forth in claim 1 further including for delivering air for combustion to the combustion other than through the nozzle port.

31. A fuel injection system as set forth in claim 30 wherein the air for combustion is delivered to the combustion chamber through a scavenge port.

32. A fuel injection system as set forth in claim 31 wherein the nozzle port is formed adjacent the scavenge port.

33. A fuel injection system as set forth in claim 32 wherein the scavenge port is divided into a pair of ports and the nozzle port is disposed between said pair of scavenge ports.

34. A fuel injection system as set forth in claim 32 wherein the scavenge port opening is formed with a portion that projects into the opening and wherein the nozzle port is formed in said portion.

35. A fuel injection system as set forth in claim 32 wherein the nozzle port comprises a plurality of nozzle ports, each communicating with the conduit.

36. A fuel injection system as set forth in claim 35 wherein the nozzle ports are spaced from each other transversely to the direction of relative movement of the components.

37. A fuel injection system as set forth in claim 36 wherein the nozzle ports are also spaced from each other in the direction of relative movement so that they will be opened and closed at different times.

38. A fuel injection system as set forth in claim 35 wherein the nozzle ports are spaced from each other in the direction of relative movement so they will be opened and closed at different times from each other.

39. A fuel injection system as set forth in claim 37 wherein the nozzle ports are generally aligned in the direction of relative movement.

40. A fuel injection system as set forth in claim 37 wherein the nozzle ports are disposed to inject fuel at a different angle relative to each other for precluding impingement of fuel issuing from one of the nozzle ports with the fuel issuing from another of nozzle ports.

41. A fuel injection system as set forth in claim 40 wherein the pair of scavenge ports are disposed on the transverse sides of the scavenge port in the direction of relative movement of the components.

42. A fuel injection system as set forth in claim 31 wherein the scavenge port is opened later than the nozzle port.

43. A fuel injection system as set forth in claim 30 wherein the combustion air and the source of pressurized gas are provide by the same source.

44. A fuel injection system as set forth in claim 43 wherein the same source comprises an air compressor.

45. A fuel injection system as set forth in claim 44 wherein the air compressor is driven by the engine.

46. A fuel injection system as set forth in claim 43 wherein the air compressor is formed by a further variable volume chamber formed by the pair of relatively moveable components.

47. A fuel injection system as set forth in claim 1 wherein the engine is a reciprocating engine and one of the components comprises a piston and the other of the components comprises a cylinder block and cylinder head assembly.

48. A fuel injection system as set forth in claim 47 wherein the nozzle port is formed by an opening in the wall of the cylinder block.

49. A fuel injection system as set forth in claim 48 wherein the nozzle port comprises a plurality of nozzle ports, each communicating with the conduit.

50. A fuel injection system as set forth in claim 49 wherein the nozzle ports are circumferentially spaced from each other.

51. A fuel injection system as set forth in claim 50 wherein the nozzle ports are also spaced from each other in the direction of reciprocation of the piston so that they will be opened and closed at different times.

52. A fuel injection system as set forth in claim 49 wherein the nozzle ports are spaced from each other in the direction of reciprocation of the piston so they will be opened and closed at different times from each other.

53. A fuel injection system as set forth in claim 52 wherein the nozzle ports are generally aligned in the direction of reciprocation of the piston.

54. A fuel injection system as set forth in claim 49 wherein the nozzle ports are disposed to inject fuel at a different angle relative to each other for precluding impingement of fuel issuing from one of the nozzle ports with the fuel issuing from another of nozzle ports.

55. A fuel injection system as set forth in claim 47 wherein the fuel injector injects fuel into an accumulator chamber formed in the conduit.

56. A fuel injection system as set forth in claim 47 wherein the mean for delivering pressurized gas to the conduit comprises means for delivering pressurized atmospheric air.

57. A fuel injection system as set forth in claim 56 wherein the means for delivering pressurized air comprises an air compressor.

58. A fuel injection system as set forth in claim 57 wherein the air compressor is driven by the engine.

59. A fuel injection system as set forth in claim 58 further including a second air compressor for further compressing the air compressed by the first mentioned air compressor.

60. A fuel injection system as set forth in claim 57 wherein the air compressor comprises a crankcase chamber.

61. A fuel injection system as set forth in claim 47 wherein the means for delivering a pressurized gas comprises means for delivering exhaust gases from the combustion chamber to the conduit.

62. A fuel injection system as set forth in claim 47 wherein the combustion chamber includes a combustion recess and further including a spark plug positioned in the combustion recess and wherein the nozzle port is directed toward the spark plug.

63. A fuel injection system as set forth in claim 47 further including an exhaust port in the cylinder block and opened and closed by the piston.

64. A fuel injection system as set forth in claim 63 wherein the timing of opening of the exhaust port and of the nozzle port is substantially the same.

65. A fuel injection system as set forth in claim 64 wherein the nozzle port is disposed contiguous to the exhaust port.

66. A fuel injection system as set forth in claim 65 wherein the nozzle port comprises a plurality of nozzle ports, each communicating with the conduit.

67. A fuel injection system as set forth in claim 66 wherein the exhaust port is divided into a pair of exhaust ports disposed on transverse sides of the nozzle ports in the direction of relative movement of the components.

68. A fuel injection system as set forth in claim 66 wherein the nozzle ports are disposed on opposite sides of the exhaust port.

69. A fuel injection system as set forth in claim 47 further including means for delivering air for combustion to the combustion chamber other than through the nozzle port.

70. A fuel injection system as set forth in claim 69 wherein the air for combustion is delivered to the combustion chamber through a scavenge port.

71. A fuel injection system as set forth in claim 70 wherein the nozzle port is formed adjacent the scavenge port.

72. A fuel injection system as set forth in claim 71 wherein the scavenge port is divided into a pair of ports and the nozzle port is disposed between said pair of scavenge ports.

73. A fuel injection system as set forth in claim 71 wherein the scavenge port opening is formed with a portion that projects into the opening and wherein the nozzle port is formed in said portion.

74. A fuel injection system as set forth in claim 71 wherein the nozzle port comprises a plurality of nozzle ports, each communicating with the conduit.

75. A fuel injection system as set forth in claim 74 wherein the nozzle ports are circumferentially spaced from each other.

76. A fuel injection system as set forth in claim 75 wherein the nozzle ports are also axially spaced from each other so that they will be opened and closed at different times.

77. A fuel injection system as set forth in claim 74 wherein the nozzle ports are axially spaced from each other so they will be opened and closed at different times from each other.

78. A fuel injection system as set forth in claim 77 wherein the nozzle ports are generally axially aligned.

79. A fuel injection system as set forth in claim 74 wherein the nozzle ports are disposed to inject fuel at a different angle relative to each other for precluding impingement of fuel issuing from one of the nozzle ports with the fuel issuing from another of nozzle ports.

80. A fuel injection system as set forth in claim 79 wherein the pair of scavenge ports are disposed on the transverse sides of the scavenge port in the direction of relative movement of the components.

81. A fuel injection system as set forth in claim 70 wherein the scavenge port is opened later than the nozzle port.

82. A fuel injection system as set forth in claim 69 wherein the combustion air and the source of pressurized gas are provide by the same source.

83. A fuel injection system as set forth in claim 82 wherein the same source comprises an air compressor.

84. A fuel injection system as set forth in claim 83 wherein the air compressor is driven by the engine.

85. A fuel injection system as set forth in claim 83 wherein the air compressor is formed by a crankcase chamber.

86. A fuel injection system as set forth in claim 48 further including flow restricting means in the conduit upstream of the nozzle port for controlling the amount of fuel delivered to the combustion chamber.

87. A fuel injection system for an internal combustion engine having variable volume combustion chamber defined by a pair of relatively movable components, a plurality of nozzle ports extending through one of said components and opened and closed only by the relative movement of said components, said nozzle ports begin spaced from each other transversely to the direction of relative movement of said components, a conduit extending to said nozzle port from externally of said combustion chamber, means for delivering a pressurized gas to said conduit at least during a portion of the time when said nozzle port is opened, and a fuel injector for injecting fuel into said conduit.

88. A fuel injection system as set forth in claim 87 wherein the nozzle ports are formed by openings in the wall of one of said relatively moveable components which defines a portion of the combustion chamber.

89. A fuel injection system as set forth in claim 88 wherein the nozzle ports are also spaced from each other in the direction of relative movement so that they will be opened and closed at different times.

90. A fuel injection system for an internal combustion engine having a variable volume combustion chamber defined by a pair of relatively movable components, a plurality of nozzle ports extending through one of said components, said nozzle ports being spaced from each other in the direction of relative movement so they will be opened and closed at different times from each other, a conduit extending to said nozzle ports form externally of said combustion chamber, mean for delivering a pressurized gas to said conduit at least during a portion of the time when said nozzle port is opened, and a fuel injector for injecting fuel into said conduit.

91. A fuel injection system as set forth in claim 90 wherein the nozzle ports are generally aligned in the direction of relative movement.

92. A fuel injection system as set forth in claim 90 wherein the nozzle ports are disposed to inject fuel at a different angle relative to each other for precluding impingement of fuel issuing from end of the nozzle ports with the fuel issuing form another of nozzle ports.

93. A fuel injection system for a two cycle internal combustion engine having a cylinder block/cylinder head assembly defining a cylinder bore closed by the said cylinder head, a piston reciprocating in said cylinder bore, a scavenge port extending through said cylinder bore in a position to be opened and closed by the reciprocation of said piston, means for delivering an air charge to said scavenge port, an exhaust port opening through said cylinder bore and opened and closed by the reciprocation of said piston, a nozzle port extending through said cylinder bore and opened and closed only by the reciprocation of said piston, an accumulator chamber formed by said cylinder block/cylidner head assembly and communicating with said nozzle port, means for delivering a pressurized air charge to said accumulator chamber for discharge into said cylinder bore when said nozzle port is opened, and a fuel injector for injecting fuel into said accumulator chamber.

94. A fuel injection system for a two cycle internal combustion engine as set forth in claim 93 wherein the nozzle port comprises a plurality of nozzle ports, each communicating with the accumulator chamber.

95. A fuel injection system for a two cycle internal combustion engine as set forth in claim 95 wherein the nozzle ports are circumferentially spaced form each other.

96. A fuel injection system for a two cycle internal combustion engine as set forth in claim 95 wherein the nozzle ports are also spaced from each other int the direction of relative movement so that they will be opened and closed at different times.

97. A fuel injection system for a two cycle internal combustion engine as set forth in claim 96 wherein the nozzle ports are spaced form each other axially along the cylinder bore so they will be opened and closed at different times from each other.

98. A fuel injection system for a two cycle internal combustion engine as set forth in claim 97 wherein the nozzle ports are generally aligned in an axial direction.

99. A fuel injection system for a two cycle internal combustion engine as set forth in claim 94 wherein the nozzle ports are disposed to inject fuel at a different angels relative to each other for precluding impingement of fuel issuing form one of the nozzle ports with the fuel issuing from another of nozzle ports.

100. A fuel injection system for a two cycle internal combustion engine as set forth in claim 93 wherein the scavenge port is opened later than the nozzle port.

* * * * *

UNITED STATES PATENT AND TRADEMARK OFFICE
CERTIFICATE OF CORRECTION

PATENT NO. : 5,249,557
DATED : October 5, 1993
INVENTOR(S) : Masahiko Katoh, et al It is certified that error appears in the above-indentified patent and that said Letters Patent is hereby corrected as shown below:

Column 13, line 50, Claim 30 after "including" insert --means--.
Column 13, line 51, Claim 30 after "combustion" insert --chamber--.
Column 16, line 44, Claim 87 after "having" insert --a--.

Column 17, line 3, Claim 90 delete "form" and insert --from--.
Column 17, line 5, Claim 90 delete "mean" and insert --means--.
Column 17, line 15, Claim 92 delete "end" and insert --one--.
Column 17, line 16, Claim 92 delete "form" and insert --from--.
Column 17, line 30, Claim 93 delete "cylidner" and insert --cylinder--.
Column 18, line 8, Claim 95 delete "95" and insert --94--.
Column 18, line 9, Claim 95 delete "form" and insert --from--.
Column 18, line 13, Claim 96 delete "int" and insert --in--.
Column 18, line 18, Claim 97 delete "form" and insert --form--.
Column 18, line 27, claim 99, delete "angels" and insert --angles--

Signed and Sealed this

Twenty-seventh Day of September, 1994

Attest:

BRUCE LEHMAN

Attesting Officer

Commissioner of Patents and Trademarks